Dec. 8, 1959     E. P. D'AZZO     2,916,247
AWNING HEAD ROD HOLDER
Filed May 24, 1957
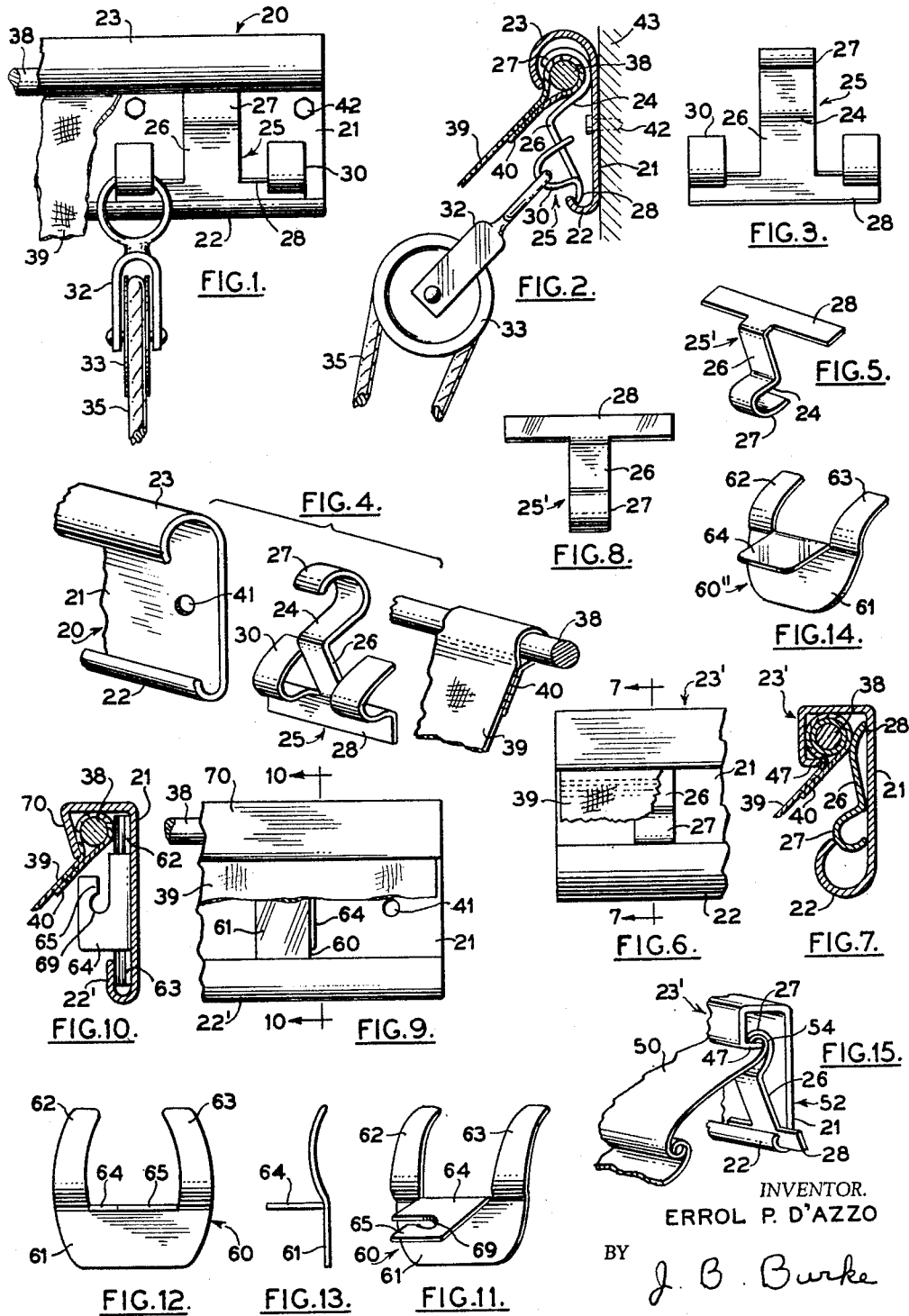
INVENTOR.
ERROL P. D'AZZO
BY J. B. Burke
ATTORNEY

United States Patent Office 2,916,247
Patented Dec. 8, 1959

2,916,247

AWNING HEAD ROD HOLDER

Errol P. D'Azzo, Brooklyn, N.Y.

Application May 24, 1957, Serial No. 661,518

5 Claims. (Cl. 248—273)

This invention relates to the art of awning supports and particularly concerns holders for awning head rods, ropes, and the like.

It is a principal object of the present invention to provide a means for securing and supporting an awning head rod or rope on a vertical support with a quick detachable screwless fastener.

It is a further object to provide a fastener for wedging and restricting movement of an awning head rod or rope in a head rod support.

It is a further object to provide a fastener as described with means for supporting a pulley.

It is a further object to provide a molding and associated fastener element for securing and supporting an awning head rod in an elevated position.

Other and further objects and advantages of that invention will become apparent from the following description taken together with the drawing, wherein:

Fig. 1 is a front elevational view of a head rod support embodying the invention.

Fig. 2 is an elevational view of the support.

Fig. 3 is an elevational view of a fastener element employed in the support.

Fig. 4 is an exploded perspective view of a head rod and support.

Fig. 5 is a perspective view of one form of fastener element according to the invention.

Fig. 6 is a front elevational view of the head rod support employing the fastener element of Fig. 5.

Fig. 7 is a sectional view taken on lines 7—7 of Fig. 6.

Fig. 8 is an elevational view of the fastener element of Fig. 5.

Fig. 9 is a front elevational view of a head rod support embodying another form of the invention.

Fig. 10 is a sectional view taken on lines 10—10 of Fig. 9.

Fig. 11 is a perspective view of the fastener element employed in the support of Fig. 9.

Fig. 12 is a front elevational view of the fastener element of Fig. 11.

Fig. 13 is an end elevational view of the fastener element of Fig. 11.

Fig. 14 is a perspective view of a modified form of the fastener element without pulley holder.

Fig. 15 is a perspective view of an awning slat supported by a molding strip and fastener element according to the invention.

In Figs. 1, 2 and 4, there is shown a molding 20 which may be an extruded strip of metal formed with an elongated flat section 21, a narrow upturned portion 22 defining a ledge and a wide down turned portion 23 defining an eave. A fastener element 25 is associated with the molding 20. This fastener element is best shown in Figs. 2, 3 and 4. It is a metal strip having a substantially straight central section 26 bent at one end 27 into a cylindrical curve extending about 270° from one end of the central section 26. At its other end the central section terminates in a slightly curved or offset transversely extending section 28. At the outer ends of transverse section 28 are bent hooks 30 which are curved in such a manner as to support the pulley bracket 32 in which is rotatably mounted the pulley wheels 33 which carries awning rope 35. A cylindrical awning head rod or rope 38 is disposed inside the curved portion 23 of the molding. A fabric awning sheet 39 encircles the head rod or rope and terminates in the hem 40. The molding section 21 is provided with holes 41 through which bolts 42 may be inserted to secure the molding to a vertical support 43 such as a building wall. The fastener element 25 is shown in operative position in Figs. 1 and 2. The curved portion 27 partially encircles the head rod 38 which is enclosed in the loop of the awning formed by sheet 39 and hem 40. The end section 28 is lodged in the trough of ledge 22 of the molding. It will be noted that there is a forwardly extending section 24 connecting the curved portion 27 to the central portion 26. The section 24 terminates forwardly under the free end of eave 23. This free end is spaced a distance from the flat section 21 substantially equal to the diameter of the head rod 38. The awning covered head rod cannot come out of the eave since the combined thickness of the head rod and curved section 27 exceeds the distance from the free edge of the eave to the section 21. When it is desired to remove the head rod from the molding, the fastener element is manually lifted upwardly to the top of the interior of eave 23 so that the free end of section 28 clears the free end of ledge 22. Then the fastener element is pulled forwardly and rotated upwardly until the curved portion 27 is rotated out of engagement with eave 23 and the head rod. When installing the head rod, awning and fastener element in the molding, a reverse operation is performed. First the head rod is inserted under eave 23. Then the curved section 27 of fastener element is placed in a partial encircling position under the rod with section 26 extending forwardly. Then the fastener element is turned down and pushed upwardly so that section 28 enters the molding ledge 22. As the fastener element is being pushed upwardly it pushes up the awning covered head rod and when the fastener element is slightly lowered the head rod becomes wedged in the eave between the interior thereof and the fastener element while the section 28 becomes lodged in ledge 22.

If desired, the pulley supporting wings 30 can be omitted so that the fastener element will have the form of the element 25' shown in Figs. 5–8. The fastener element in this form will be used in the same way as described for Figs. 1–4 to engage and release the awning covered head rod. It is important to note that the retention of the head rod in the eave really only requires the curved section 27 and the extending sections 24 and 26, since as pointed out above, the combined thickness of the head rod and curved section of the rod exceed the distance from the free end of eave 23 to the back plate portion 21 of the molding. It is thus possible to omit section 28 from the fastener element 25' and omit the lower ledge 22 from the molding. The provision of the transverse section 28 supported in ledge 22 is preferred however, since it provides increased support to the fastener element and aids the eave 23 in supporting the head rod. Also the section serves as a support for the pulley holding members 30.

It is possible to use the fastener element 25' in a reversed position as illustrated in Figs. 6 and 7. In this use of the fastener element the end section 26 is uppermost and the curved end 27 is at the bottom. The awning covered head rod in the eave 23' may have a generally rectangular U-shape as shown in the drawing; it may be curved as shown in Fig. 4 or have an inwardly inclined wall as shown in Fig. 10. In any case the free edge of the eave will be spaced from the back thereof a distance substantially equal to the diameter of the head rod, and less than the combined thickness of the head rod and fastener element. To install awning covered head rod in eave 23', the head rod is first inserted into the eave 23' near the top thereof. Then the fastener element 25' is brought up and section 28 is used as a lever to raise the head rod upwardly and push it forwardly into engagement with the lower ledge 47 of eave 23'. The fastener element thus serves as a lever, wedge, and restraining member. As the head rod becomes engaged on ledge 47, the curved end 27 of the fastener is pushed past the free upper end of ledge 22. A slight lowering of the fastener then secures the bottom of the fastener in the ledge 22.

In both uses of the fastener element described, it will be clear that any increase in downward pull on the awning, only serves to increase the resisting wedging action of the fastener element. Removal of the fastener element is accomplished in both instances without the use of tools. It only requires a slight lifting of the fastener so that its bottom edge clears the top of the ledge 22 and then the fastener and awning covered head rod are easily released from the eave of the molding.

In Fig. 15 the fastener 25' is shown securing and retaining a curved awning slat 50 in the molding 52. The ledge 22' of the molding may be made rather narrow if desired to snugly retain section 28 therein. The section 28 and /or the ledge 22 may be omitted if a weaker support is desired. In either case the combined thickness of the rolled or curved end 54 of the slat and the section 27 must exceed the distance from the free edge of ledge 47 to the face of section 21. Then the curved end 27 of the fastener 25' encircles the curved end 54 of the slat and retains it in the same manner as the awning covered head rod is retained in the assemblies of Figs. 1 and 2.

In Figs. 9–13 are shown another embodiment of the invention. The fastener element 60 is generally U-shaped with a flat bight section 61 and curved arms 62, 63. The fastener is formed from a single piece of flexible metal and has a forwardly extending flat projection 64. This projection may be formed with cut-out 69 defining a jaw 65. A pulley bracket may be engaged in the cut-out 69 between jaw 65 and the body of the projection 64 when the fastener element is installed in a molding as shown in Figs. 9 and 10. To install the fastener element, the head rod 38 covered by awning 39 is first inserted in the eave which is here shown as having a rearwardly inclined wall 70. The fastener element is then placed against the flat portion 21 of the molding with the plane of projection 64 disposed horizontally. Projection 64 then serves as a finger grip member which is grasped to turn the fastener element. The curved spring finger 62 then pushes the head rod forwardly into engagement with the inner side of wall and retains it there under spring tension, while the other finger 63 becomes lodged in the ledge 22'. This wedging and retaining of the awning covered head rod is accomplished merely by turning the fastener element in the molding. The fastener element is removed by turning in an opposite direction. The head rod as clearly shown in Fig. 10 cannot move past the top edge of the projection 64 which serves as a locking element. Any increase in pulling force on awning 39 only increases the resisting wedging action of the fastener element.

In Fig. 14, the fastener element 60" is similar to the fastener element 60 except that the projection 64 is not formed with jaw 65. This structure results in a stronger forward projection to retain the head rod in the eave.

The distance from the free edge of the eave is less than the combined thickness of the head rod and fastener element in Figs. 9 and 10 in order to retain the head rod in the eave. Jaw 64 serves as a supplementary supporting element with arm 63 lodged in the ledge 22'. Any of the other forms of molding shown in Figs. 1 and 7 may be used with the fasteners 60 and 60".

In all the embodiments described, the molding may be made as long as desired from an inch or two in length to any length desired. The molding is so formed that it can be extruded or otherwise formed by mass production methods at low cost. The fastener elements can be stamped out of flat stock strip metal at low cost by conventional metal fabricating methods. As many fastener elements can be used with any one molding as desired. The several fastener elements will be spaced along the molding at desired intervals. The fastener elements are so arranged that they can be removed easily and moved to another location along the molding with a minimum of effort and without the use of wrenches, screw drivers or other tools as required in conventional awning supports.

In the specification and claims the term "head rod" may be taken to signify a cylindrical solid or hollow member made of metal, fibre, plastic, etc. The term "head rod" may also be taken as synonymous with "head rope" which is a fibrous member commonly used at the upper edges of awnings.

What is claimed and sought to be protected by Letters Patent of the United States is:

1. A support for an awning head rod and pulley bracket on a molding, comprising a generally U-shaped fastener having a pair of curved resilient arms, a generally flat bight, and a flat projection formed at the bight and extending perpendicularly outward for turning the fastener in the molding, said projection being formed with a cut-out defining a jaw for supporting said pulley bracket thereon.

2. A support for an awning head rod and pulley bracket, comprising an elongated molding having a flat section adapted for securing the molding to an elevated vertical support member, said section having an upwardly turned portion at the bottom edge thereof forming an interior channel, said section having a downwardly turned portion at the opposite edge thereof defining an eave overhanging the ledge to retain said head rod therein, and a generally U-shaped fastener having one curved spring arm adapted to raise and push said head rod forwardly in said eave to wedge the head rod therein, said fastener having another curved spring arm adapted to fit under tension into said channel, a flat bight formed between the spring arms, and a projection formed on the bight and extending perpendicularly thereto for turning the fastener in the molding, said projection having a cut-out defining a jaw for supporting said pulley bracket thereon.

3. A support for an awning head rod, comprising an elongated molding having a flat section adapted for securing the molding to an elevated vertical support member, said section having an upwardly turned portion at the bottom edge thereof forming an interior channel, said section having a downwardly turned portion at the opposite edge thereof defining an eave overhanging the ledge to retain said head rod therein, and a generally U-shaped fastener having one curved spring arm adapted to raise and push said head rod forwardly in said eave to wedge the head rod therein, said fastener having another curved spring arm adapted to fit under tension into said channel, a flat bight formed between the spring arms, and a projection formed on the bight and extending perpendicularly thereto for turning the fastener in the molding.

4. A support for an awning head rod in an elongated molding having a flat section adapted for securing the molding to an elevated vertical support member, said section having an upwardly turned portion at the bottom edge thereof forming a ledge having an interior channel, said section having a downwardly turned portion at the opposite edge thereof defining an eave overhanging the ledge to retain said head rod therein, comprising a generally U-shaped fastener having one curved arm adapted to raise and push said head rod forwardly in said eave to wedge the head rod therein under spring tension, said fastener having another curved arm adapted to fit under spring tension into said channel, a flat bight joining said arms at one end thereof, and a projection formed on the bight and extending outwardly therefrom for turning the fastener in the molding, said fastener having a width between outer edges of said arms which is less than the distance between free edges of said upwardly and downwardly turned portions of said molding, so that the fastener is insertable into said molding with said arms parallel to said free edges and the fastener is then turnable in the molding to engage said arms in said eave and ledge.

5. A support for an awning head rod and pulley bracket according to claim 4, wherein said projection has a cut-out defining a jaw for supporting said pulley bracket thereon.

References Cited in the file of this patent

UNITED STATES PATENTS

| | | |
|---|---|---|
| 2,287,667 | Brown | June 23, 1942 |
| 2,303,706 | Place | Dec. 1, 1942 |
| 2,726,056 | Tatom et al. | Dec. 6, 1955 |